Sept. 25, 1928.
J. M. LARSON
1,685,286
FLUID PRESSURE CONTROL VALVE
Filed Nov. 7, 1921      2 Sheets-Sheet 1
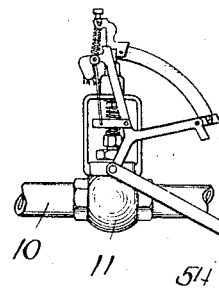
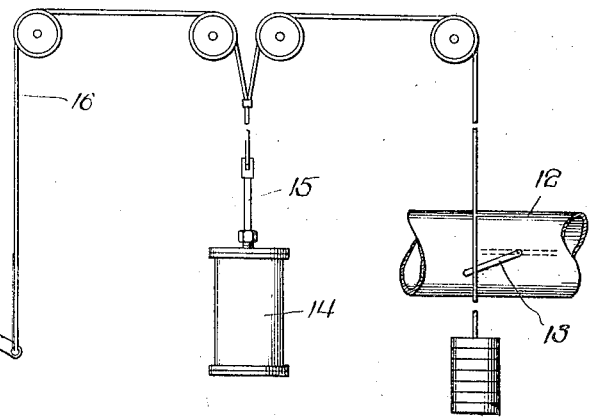
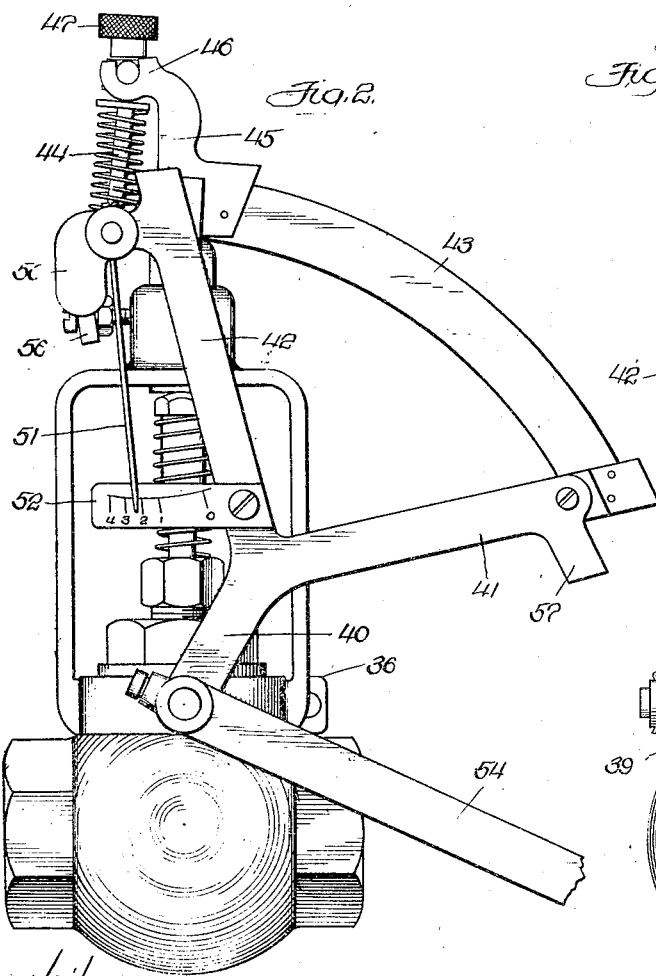
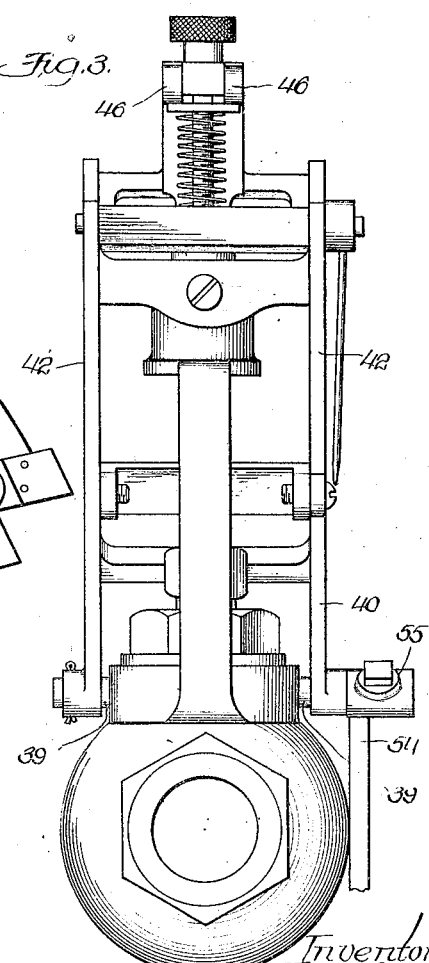

Sept. 25, 1928.
J. M. LARSON
1,685,286
FLUID PRESSURE CONTROL VALVE
Filed Nov. 7, 1921   2 Sheets-Sheet 2
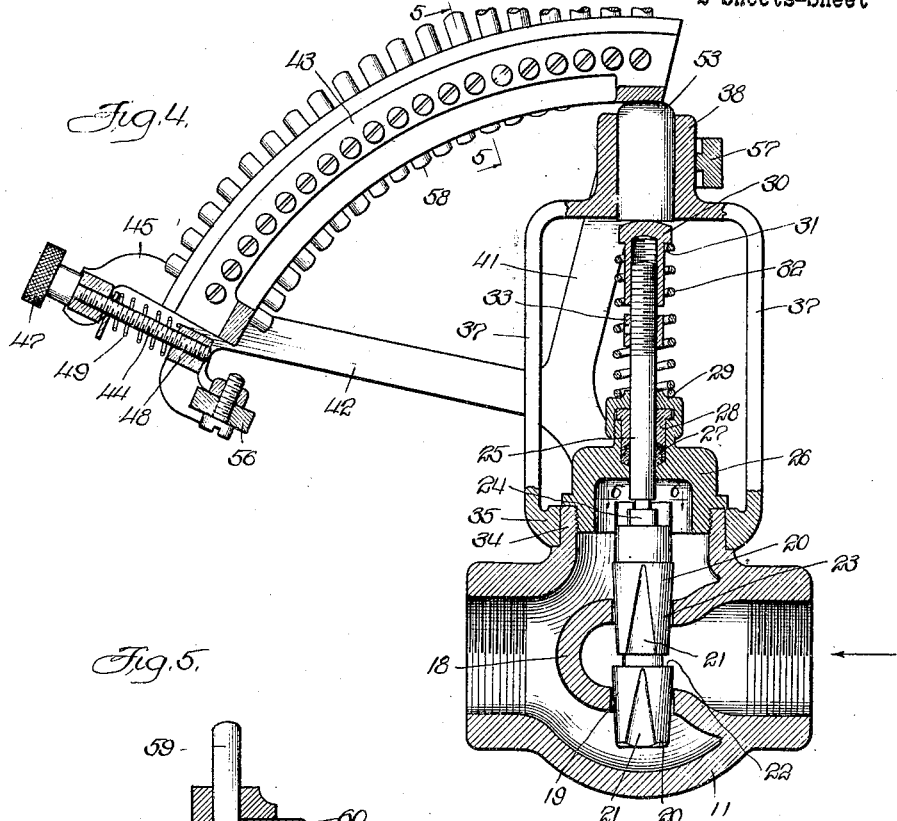
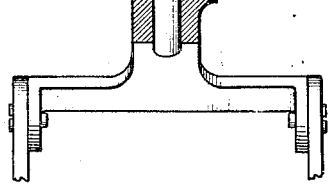
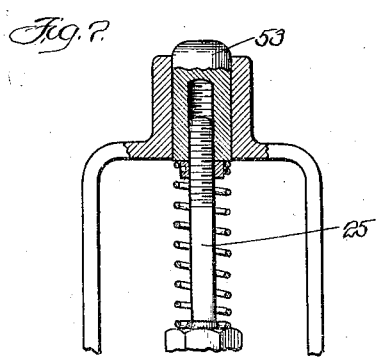
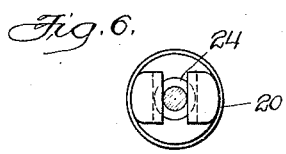
Inventor:
John M. Larson
By Jones, Addington, Ames & Seibold
Attys.

Patented Sept. 25, 1928.

1,685,286

UNITED STATES PATENT OFFICE.

JOHN M. LARSON, OF CHICAGO, ILLINOIS, ASSIGNOR TO NATIONAL REGULATOR COMPANY, OF CHICAGO, ILLINOIS, A CORPORATION OF ILLINOIS.

FLUID-PRESSURE-CONTROL VALVE.

Application filed November 7, 1921. Serial No. 513,541.

My invention relates to fluid pressure control valves and it has especial relation to valves wherein means are provided which regulate the valve opening in accordance with the load fluctuations of the machine which is supplied with motive fluid through said valve.

More particularly my invention contemplates providing a valve wherein means are embodied which respond automatically to load fluctuations, and moreover wherein means are positioned whereby the limits between which said valve is controlled, may be varied as desired.

A device embodying my invention may be utilized in many different combinations, but I find the same particularly advantageous in connection with a boiler draft system and I will hereinafter describe my invention in connection with such an apparatus.

In a boiler system it is usual to maintain a forced draft and it is very beneficial, especially as regards power consumption of the unit which is supplying the forced draft, to cause the motive fluid which is supplied to such a unit to vary automatically as the demand on such unit fluctuates. Again, I find it desirable to provide means whereby the ultimate load, during any particular period of operation, may be fixed in accordance with pre-determined factors. In this connection a concrete example may be described as a forced draft system wherein a battery of boilers are taken care of. If only one-half of a battery of four boilers is in operation it is quite conducive to economy of fuel consumption to supply only a pre-determined amount of motive fluid to the unit which is causing the forced draft. That is, I contemplate providing means whereby the fuel supply is limited as dictated by the number of boilers which are being operated. Having determined that a certain maximum fuel supply is necessary when the load on the forced draft unit is, for instance, two boilers, my invention at the same time embodies means whereby the fluctuations in load demand on these two boilers are automatically responded to, and the motive fluid supply varied in accordance therewith.

My invention, therefore, contemplates providing a compact and simple valve control mechanism which may be bodily applied to the steam line which furnishes the motive fluid to the unit, such for instance, as a blower, which supplies the air under pressure that is necessary for forced draft operation. It is my intention to embody in this device means which shall vary the opening and closing of a valve in response to the load demand on the blower, and at the same time incorporate therewith means whereby the maximum opening of said valve is governed in accordance with the number of boilers which are being supplied with the forced draft during any particular period.

Other advantages of my invention, as well as the manner in which it is applied to a forced draft boiler system as hereinbefore indicated, will be better understood from the hereinafter description of my invention taken in connection with the accompanying drawings, in which:

Figure 1 is a diagrammatic view of the manner in which my valve control mechanism is combined with a boiler system;

Fig. 2 is an elevational side view of a device embodying my invention;

Fig. 3 is an elevational end view of the device taken from the left hand side of Fig. 2;

Fig. 4 is an elevational sectional view of my device, a modified form of segmental cam being utilized therein;

Fig. 5 is a sectional view taken on the line 5—5 of Fig. 4;

Fig. 6 is a plan view, partially in section, taken on the line 6—6 of Fig. 4; and Fig. 7 is a fragmentary elevational view, partially in section, of a portion of my device.

Referring now more particularly to the drawings, a fluid supply pipe 10 has the steam flow therethrough governed by a valve 11 which is interposed in the pipe, as shown in Fig. 1. It will be understood that the steam supply through the pipe 10 is utilized to drive any desired form of air pumping unit, and that the air from the latter is supplied to a battery of boilers or to any portion of said battery, in order to force the draft therethrough.

A flue 12 is embodied in the boiler system and has positioned therein a damper 13, the latter being adapted to be opened and closed by an automatic system, as shown, which is controlled by a boiler regulator 14. It will be understood that a stem 15 of the boiler regulator is moved in accordance with pre-determined conditions. The mechanism of the regulator 14 is that shown in my United States Patent No. 1,376,948, May 3, 1921; Serial No. 172,535, filed June 2, 1917, and assigned to the National Regulator Company.

In the embodiment of my invention hereinafter described, I have utilized the boiler regulator 14 to open and close the valve 11 in accordance with the pre-determined conditions which govern the operation of the regulator. In Fig. 1 I have shown the regulator as connected to the valve control mechanism through a band 16.

I will first describe the valve mechanism which is utilized in connection with my invention and for this purpose reference may best be had to Fig. 4. A casing 11 is interiorly provide with a walled pocket 18, ports 19—19 being formed in the wall 18. These ports are adapted to be opened and closed by two pistons 20—20, these pistons being frustro-conical in shape, and being recessed at 21—21 to provide for the passage of steam as the pistons are moved upwardly from their seats. The valve is balanced since the steam pressure acts on a surface 22 of the lower piston which is the projection of a surface 23 of the upper piston upon the plane of the surface 22. This balancing of the valve is particularly advantageous in that a very small force is required to move the pistons. Moreover, the valve opening and closing member comprising the two pistons 20—20 is integrally formed and because of this fact a decided advantage in construction is eventuated. The top of the upper piston 20 is cut away and recessed as shown (see plan view thereof in Fig. 6) to form a T slot so positioned that a head 24 may be slid transversely into the groove and under the shorter legs of the L-shaped lugs. This combination provides a very simple and quickly detachable connection between the valve piston member and a stem 25 which is integrally formed with the head 24.

Such a connection is needed because, in supplying my control valve to the trade, a plurality of piston members accompany the same. My invention contemplates the changing of these piston members as is most desirable in view of the conditions of operation. The stem 25 passes through a threaded member 26 which closes the upper opening in the valve casing 11. A packing gland 27 surrounds the stem 25 at the point where it passes through the closure member 26, said gland being held in place by a collar 28 and a nut 29 for holding said collar 28 against the packing. A member 30 is adjustably positioned over the top of the stem 25 and is provided with an annular shoulder 31 against which presses a spring 32 whereby said member 30 is constantly urged upwardly, the other end of the spring 32 bearing against the upper surface of the nut 29. A collar 33 is threaded on the stem 25 in order to limit the downward movement of the loose member 30.

Surrounding the upper annular portion 34 of the valve is an annular collar 35 which is split at 36 whereby it may be tightened about the portion 34. Rising from this collar and preferably integrally formed therewith are standards 37—37 which are joined at their tops to form a cylindrical collar 38. It will be understood, of course, that the structure which has just been described is rigidly positioned on the valve.

Pivotally mounted on the collar 35 at the points 39—39 is a yoke-like member 40 which comprises two supporting portions 41 and 42, each of the latter having arms on either side of the yoke, as shown. Between the arms 41—41 is pivotally mounted a cam 43, the other end of said cam being adjustably secured to the arms 42—42 by an adjusting screw 44. An understanding of the manner in which the end of the cam is adjustably mounted with respect to the supporting portions 42—42 may be had from Fig. 4. A bracket 45 is attached to the end of the cam and has trunnions 46—46 formed to support the adjusting screw head 47. The lower end of the screw 44 engages with a transverse member 48 which connects the outer ends of the arms 42. It will be seen, therefore, that when the head 47 is turned the end of the yoke is moved relatively to the transverse member 48, that is, to the arms 42; a spring 49 urging the latter members apart. Secured to a bracket 50, which is mounted on one of the arms 42, is a pointer 51 which moves over a scale 52 as the end of the cam 43 is moved relatively to the supporting arms 42—42. This scale is calibrated in accordance with predetermined conditions and utilized in order to initially position the outer end of the cam to limit the extreme opening movement of the valve, as desired.

Referring now again to Fig. 4, a solid cylindrical bearing member 53 rests on the top of the member 30 and is rounded at its upper end. Moreover, this solid member 53 moves in the bearing formed by the collar 38. In Fig. 7 a modified form of this bearing member is shown, the member 53 here being attached directly to the stem 25 whereby a bearing is provided at each end of said stem and any tendency for the upper end of the stem to oscillate is eliminated.

An arm 54 is rigidly secured to the yoke 40 at the point 55 and serves to swing said yoke between the limits of its movements; these limits being determined by an adjustable stop 56 which is positioned between the arms 42—42 and a permanent stop 57 which extends between the arms 41—41.

In Fig. 4 I have shown the valve-opening and closing pistons in their lowermost or furthest closed position. It will be noted that the member 53 bears against the inner surface 58 of the cam 43. As the yoke and cam are swung to the right the interior surface of the cam is so shaped that its left hand end is radially more distant from the axis, about which the yoke swings, than is its right hand end. Therefore, as this cam is swung the member 53 is pressed upwardly by the spring 32 and the stem 25 thus opens the valve. In Fig. 2 the yoke is shown as swung to its extreme right hand position and in the particular embodiment of the invention, which I am using for illustration, this position is the one in which the valve is widest open. On the other hand if the valve be opened its widest a swinging of the cam from its extreme right hand position to its extreme left hand position will force the stem 25 downwardly thereby closing the valve.

In Fig. 4 I have illustrated what I believe to be a novel form of cam and one which is of particular advantage in the invention which I have just illustrated. This cam comprises a segmental portion, as shown, having a plurality of pins 59 passing therethrough along a longitudinal plane through the center thereof. These pins are individually adjustable whereby any desired length thereof may project from the inner surface of the segment. The pins are moved by loosening the screws 60 and when these adjacent pins have been so adjusted that their inner ends comprehend the desired cam surface the screws 60 are tightened. It will be evident, therefore, that, by using this type of cam, any desired function of movement may be provided for, since the most intricate curve can be eventuated by suitable positioning of the individual pins. I believe this form of cam is entirely novel and I do not, of course, limit its application to the particular device with which it is here illustrated, although I do find its use in this connection of particular advantage, since it is frequently a fact that the fluid supply is not a straight line function of the operation which it is desired to maintain on the machine which is fed through the steam line having my valve control thereupon.

As I have hereinbefore indicated the cam 43 is pivotally mounted between the arms 41—41, and I find that the operation of my device is made very accurate by causing the axis about which said cam is pivoted to pass through the point of contact between the member 53 and the surface of the cam when the valve is farthest closed. Such positioning of the pivotally mounting of the cam insures that no movement of the stem 25 takes place when the other end of the cam is moved in accordance with the maximum expected load.

Having described one embodiment of my invention the operation thereof is as follows:

The maximum expected load is pre-determined and, by the movement of the screw head 47, the left hand end of the cam 43 is initially positioned to admit of a pre-determined valve opening for full load conditions, the pointer being moved over the previously calibrated scale as this adjustment takes place. All fluctuations under this limit are automatically responded to through connection of the band 16 and the arm 54, the cam moving over and in contact with the element 53 whereby the valve is opened and closed, as said load fluctuations take place. If it is desired to change the maximum possible fluid supply, the relative movement between the adjustable end of the cam and the supporting yoke may be obtained very simply and without in any manner suspending operations.

It will be observed that I obtain all of the above desirable adjustments and automatic regulations through the use of a very simple and compact device which has few moving parts and which is so constructed that whatever moving parts do deteriorate may be easily replaced without installing an entirely new device. Moreover, my device may be applied to any boiler system by the simple interposition of the valve, with its associated control apparatus, in the proper fluid supply line.

While I have described but one embodiment of my invention many modifications thereof may occur to those skilled in the art, and I desire, therefore, that the same be limited only by the showing of the prior art and by the scope of the appended claims.

What I claim as new and desire to secure by Letters Patent of the U. S. is:

1. In a device for governing the supply of motive fluid to a machine, a valve, a movable operating member associated with said valve, a frame adapted to be positioned on said valve to provide a bearing for said operating member, a yoke pivotally mounted on said frame and provided with supporting portions, a segmental cam pivotally mounted at one end on one of said supporting portions and adjustably mounted at the other end on another supporting portion, and an arm extending from said yoke whereby the latter may be moved to bring said cam into contact with said valve operating member and open and close said valve.

2. In a device for governing the supply of motive fluid to a machine, a valve, a movable operating member associated with said valve, a frame adapted to be positioned on said valve to provide a bearing for said operating member, a yoke pivotally mounted on said frame and provided with supporting portions, a segmental cam pivotally mounted at one end on one of said supporting portions and adjustably mounted at the other end on another supporting portion, an arm extending from said yoke whereby the latter may be moved to bring said cam into contact with said valve operating member and open and close said valve, and means comprising an adjusting screw for shifting the adjustable end of said cam towards and away from its support to limit the ultimate opening movement of said valve.

3. In a device for governing the supply of motive fluid to a machine, a valve, a movable operating member associated with said valve, a frame adapted to be positioned on said valve to provide a bearing for said operating member, a yoke pivotally mounted on said frame and provided with supporting portions, a segmental cam pivotally mounted at one end on one of said supporting portions and adjustably mounted at the other end on another supporting portion, an arm extending from said yoke whereby the latter may be moved to bring said cam into contact with said valve operating member and open and close said valve, means comprising an adjusting screw for shifting the adjustable end of said cam towards and away from its support to limit the ultimate opening movement of said valve, a scale on said device which is calibrated in accordance with the service in which said device is employed, and an indicating member moving over said scale and attached to the adjustable end of said cam whereby the latter may be accurately positioned as dictated by predetermined conditions to limit said valve movement.

4. In a device for governing the supply of motive fluid to a machine, a valve, an operating stem on said valve, a yoke pivotally mounted on said device and comprising two supporting portions, a segmental cam pivotally mounted at one end on one of said supporting portions and adjustably supported at its other end on the other portion of said yoke, means for bodily shifting said yoke whereby said cam moves said valve in response to the load fluctuations on said machine, and means for shifting the adjustably supported end of said cam in accordance with pre-determined conditions to vary the ultimate limit of movement of said valve, the axis, about which said cam is moved by said adjusting means, passing through the point of contact between said operating member and said cam when said valve is in its furthest closed position.

5. In a device for governing the supply of motive fluid to an engine in accordance with the load imposed thereupon and which comprises a balanced valve, means for actuating said valve which comprises an oscillatable yoke member, an adjustable cam mounted on said member, a valve stem extension co-operating with said cam, and means, attached to said cam, for altering the angle of incidence of the cam with the valve extension.

6. In a device for governing the supply of motive fluid to an engine in accordance with the load imposed thereupon and which comprises a balanced valve, a stem on said valve, a spring normally tending to keep said valve open, an oscillatable yoke member pivotally mounted on said valve, an adjustable cam mounted on said yoke and contacting with said valve stem, and means, comprising a spring-restrained screw for altering the angle of incidence of said cam with said valve stem.

7. In a device for governing the supply of steam to a blowing engine in accordance with the load imposed thereupon which comprises a balanced valve, means for actuating said valve which latter comprises an oscillatable yoke member pivotally mounted on said valve, a stem in said valve, a segmental cam mounted on said yoke member and in slidable contact with said valve stem, and means comprising a spring-restrained screw for altering the angle of incidence of said segmental cam with said valve stem.

8. In a device for governing a supply of steam to a blowing engine in accordance with the load imposed thereupon which comprises a balanced valve, means for actuating said valve which latter comprises an oscillatable yoke member pivotally mounted on said valve, a stem in said valve, a segmental cam mounted on said yoke member and in slidable contact with said valve stem, and means comprising a spring-restrained screw for altering the angle of incidence of said segmental cam with said valve stem, a lever rigidly attached to said yoke member and a connection between said lever and a damper regulator associated with the flue of a furnace served by said blowing engine.

9. A regulating valve for controlling the admission of steam to a blowing engine serving to furnish forced draft to a furnace which comprises balanced pistons therein, a valve stem connected with said pistons for moving the same; a valve stem being normally spring-biased to hold said valve open, an adjustable cam co-operating with said valve stem, means for altering the angle of incidence of said cam with said valve stem and means associated with draft dampers associated with said furnace for moving said cam relative to said valve stem.

10. In a device for controlling the supply of motive fluid to an engine and which comprises a balanced valve having a valve stem actuated by an adjustable cam oscillatably mounted on a yoke pivotally mounted upon said valve, means for accurately adjusting the angle of incidence of said cam which comprises pivoting said cam-supporting yoke upon a point in a line which is parallel with a line passing through the center of said stem and longitudinally centrally thereof.

In witness whereof, I have hereunto subscribed my name.

JOHN M. LARSON.